United States Patent
McBride et al.

[11] Patent Number: 5,923,752
[45] Date of Patent: *Jul. 13, 1999

[54] REPLACEABLE OUTER COVER FOR PERSONAL COMMUNICATION DEVICE

[75] Inventors: Larry J. McBride; Margaret A. McBride, both of Plano, Tex.

[73] Assignee: LCC, L.L.C., Arlington, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,876

[22] Filed: Dec. 9, 1996

Related U.S. Application Data

[60] Provisional application No. 60/020,567, Jul. 1, 1996.

[51] Int. Cl.⁶ .................................................. H04M 1/00
[52] U.S. Cl. ........................... 379/433; 379/451; 379/452
[58] Field of Search .................................... 379/433, 428, 379/434, 451, 452, 437, 439; 485/90, 357

[56] References Cited

U.S. PATENT DOCUMENTS

| | | | |
|---|---|---|---|
| D. 284,372 | 6/1986 | Carpenter | D14/59 |
| D. 294,827 | 3/1988 | Woodfork | D14/59 |
| D. 346,494 | 5/1994 | Graham et al. | D3/218 |
| D. 369,607 | 5/1996 | MacGilvary et al. | D14/250 |
| 3,962,555 | 6/1976 | Efaw | 179/185 |
| 5,214,794 | 5/1993 | Van Wijnen | 455/90 |
| 5,230,016 | 7/1993 | Yasuda | 379/58 |
| 5,371,791 | 12/1994 | Schwartz et al. | 379/433 |
| 5,383,091 | 1/1995 | Snell | 361/679 |
| 5,386,084 | 1/1995 | Risko | 174/52.3 |
| 5,535,434 | 7/1996 | Siddoway et al. | 455/89 |
| 5,542,105 | 7/1996 | Finch et al. | 455/89 |

*Primary Examiner*—Jack Chiang
*Attorney, Agent, or Firm*—Finnegan, Henderson, Farabow, Garrett & Dunner, L.L.P.

[57] ABSTRACT

A replaceable outer cover for a personal communication device having a permanent rigid inner cover, a front side with controls and a back side, said outer cover comprising a second rigid cover having inside dimensions configured to conform to the outside dimensions of said inner cover, said second cover formed to comprise a unitary structure with an open back side of sufficient size to permit insertion of said inner cover into said outer cover through said back side, said outer cover having at one end thereof a partial extension over said back side to receive and hold said inner cover in position and said outer cover having at the outer end of said back side at least one clasp to grasp and hold said inner cover in place at said other end.

8 Claims, 5 Drawing Sheets

REPLACEABLE OUTER COVER FOR PERSONAL COMMUNICATION DEVICE

REFERENCE TO RELATED APPLICATION

This application is based upon U.S. Provisional Application Ser. No. 60/020,567 filed Jul. 1, 1996.

BACKGROUND OF THE INVENTION

The present invention relates to wireless cellular and Personal Communications Services ("PCS") telephones, fixed telephones, and pagers. More particularly, the present invention relates to a rigid outer cover designed to fit over existing wireless or fixed telephones, pagers, or other personal communication devices.

Wireless cellular and PCS telephones, fixed telephones, pagers, and other personal communication devices are typically available in one color. Although there are various color telephones and pagers available, the predominant color of telephones and pagers is black. The user must choose a specific color phone or pager and remain with that color phone or pager until a new unit is purchased. At the current price for such devices, this is expensive and impractical. No practical alternatives are available to change the color of the phone or pager.

Protective covers are available for such telephones and pagers. These covers are typically soft, manufactured from leather or other similar material, and include cutout portions corresponding to control buttons and other external features of the phone or pager. Due to the supple characteristic of leather and other similar materials, these covers do not maintain their shape well, causing the covers to slip, cover the external features and controls, and disrupt connection to external equipment. Soft leather covers are also difficult to clean and slippery to hold.

SUMMARY OF THE INVENTION

Accordingly, an object of the invention is to provide an outer cover that allows users of phone and pager units and other personal communication devices to change the color of their units quickly and easily. A further object of the invention is to provide a protective cover that maintains its shape and leaves access to all external controls of the unit.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention, according to one aspect, includes a replaceable outer cover for a personal communication device having a permanent rigid inner cover, a front side with controls, and a back side. The outer cover includes a second rigid cover having inside dimensions configured to conform to the outside dimensions of the inner cover. The second cover is a unitary structure with an open back side of sufficient size to permit insertion of the inner cover into the outer cover through the back side. The outer cover has at one end thereof a partial extension over the back side to receive and hold the inner cover in position, and the outer cover has at the outer end of the back side at least one clasp to grasp and hold the inner cover in place at the other end.

According to another aspect, the invention includes a system of replaceable outer covers for a personal communication device having a permanent inner rigid cover, a front side with controls, and a back side. The outer covers each have inside dimensions configured to conform to the outside dimensions of the inner cover. The outer covers are each a rigid structure with an open back side of sufficient size to permit insertion of the inner cover into the outer cover through the back side. The outer covers each have at one end thereof a partial extension over the back side to receive and hold the inner cover in position. The outer covers each have at the other end thereof at least one clasp to removably grasp and hold the inner cover in place at the other end. Each of the plurality of outer covers has a different visual presentation so as to allow selective alteration of the visual presentation of the personal communication device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
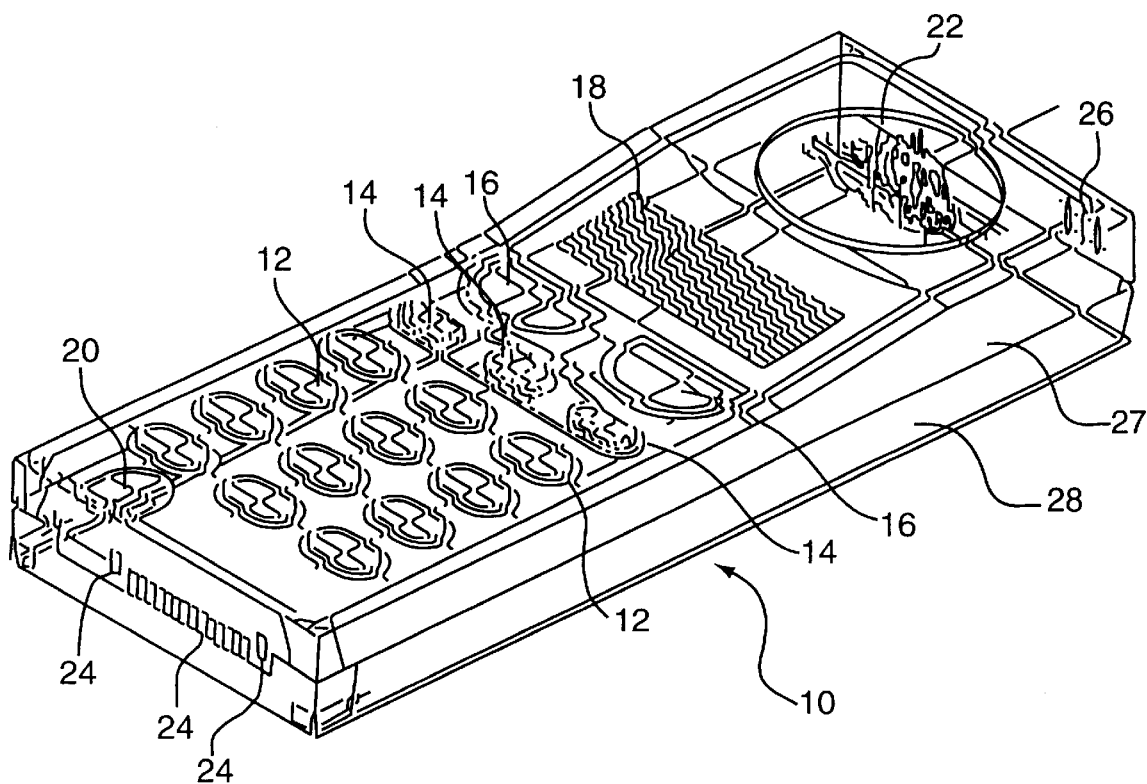
FIG. 1 is an isometric view of a conventional cellular portable telephone.
Figure 2:
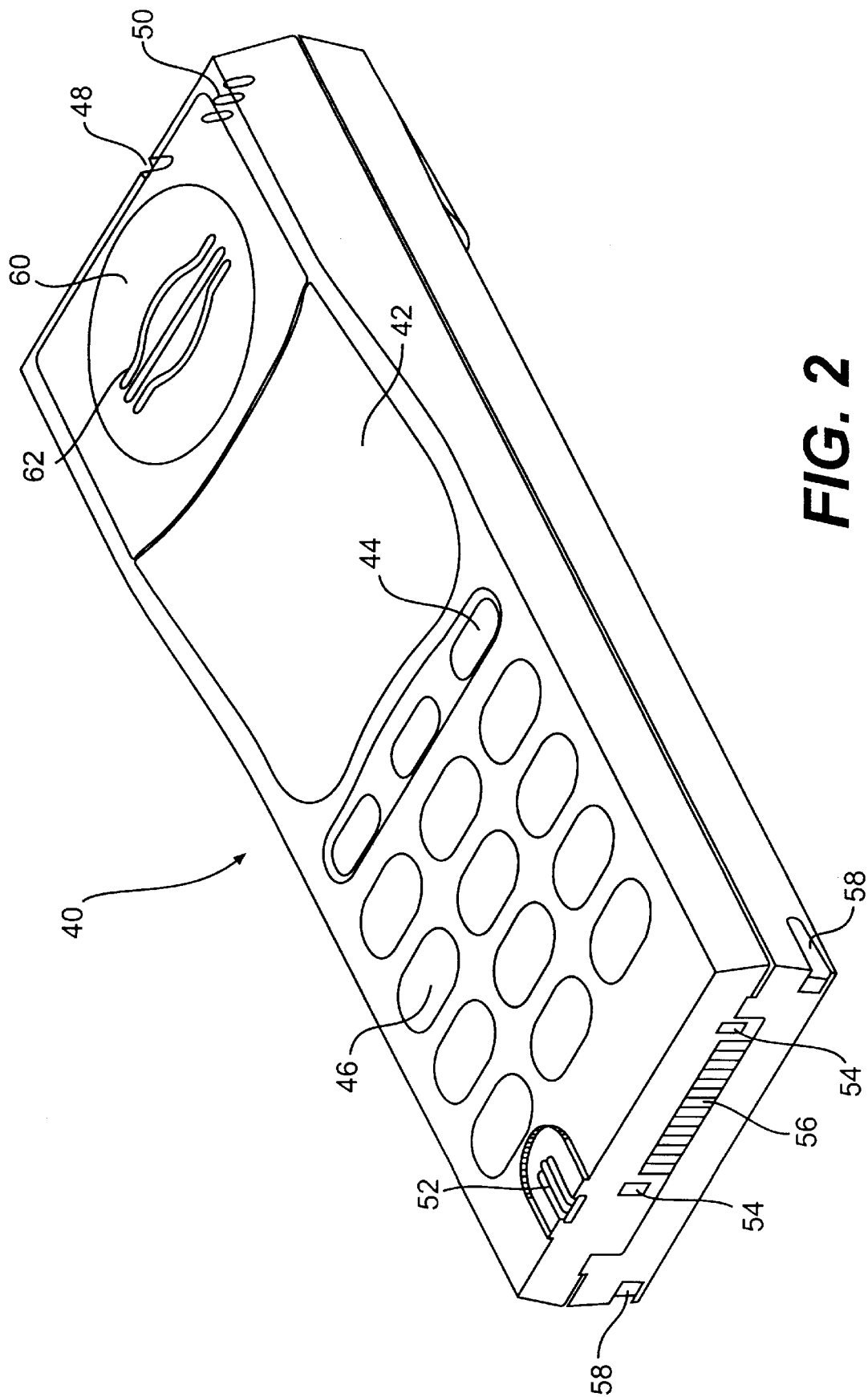
FIG. 2 is an isometric view of the preferred embodiment of a cover according to the present invention.

FIG. 1 illustrates an exemplary, conventional cellular/PCS hand portable phone for use in connection with the present invention. FIG. 1 shows all of the integral external components and connections of an exemplary portable phone. The particular phone shown in FIG. 1 is manufactured by Ericsson, Inc. as model number DH 337/338. This particular phone is used for illustrative purposes only. It is to be understood that the inventive outer cover to be described below is not limited to its use in connection with the phone shown in FIG. 1 and applies to any shape and type of cellular/PCS hand portable phone, and also to pagers and other personal communication devices.

The phone shown in FIG. 1 includes various external components and connections for use of the phone and connection to appropriate external equipment, including car kits, fax/modem connections, etc. As shown in FIG. 1, the phone, generally denoted by reference numeral 10, includes numerical keys 12 (which include the * and # keys), function keys 14 for operating, for example, the recall, clear, and menu functions of the phone, function keys 16 for operating, for example, the send and end functions, and a phone display 18. Phone 10 further includes a microphone 20, an earpiece 22, and an antenna (not shown). Openings 24 permit mounting to a vehicle mounted car unit, and opening 26 allows air circulation to the power amp of phone 10.

Phone 10 includes a conventional external housing enclosing internal circuitry and components of phone 10 but permitting access to the various numerical keys, function keys, and other interactive components for operation of phone 10. As shown in FIG. 1, the housing generally includes a top housing portion 27 fastened to a bottom housing portion 28. Housing portions 27 and 28 may be fastened together by any means known in the art to securely enclose the internal workings of phone 10. Housing portions 27 and 28 also may be made of any suitable material known in the art.

The present preferred embodiment of the invention includes a replaceable, rigid outer cover for portable phones and other personal communication devices. The rigid cover is preferably a unitary structure configured to conform to the outer dimensions of the device, and specifically the outer dimensions of the housing of the device. The structure defines detailed openings therein tailored to the external components and connections of the device, and is preferably noninteractive with the operation of the device that it encloses.

Preferably, the cover is manufactured from injected molded and/or vacuum molded plastic, or other like suitable material having sufficient rigidity. The cover is a single unit, thus making it easy to remove, replace, and reuse as the user desires. The cover may be stenciled, embossed, or silk screened as desired with any logo, so long as the logo will adequately fit on the cover. The cover may also include stencil or silk screening to identify the numbers and function keys in any language, and thus reduce the cost for having to produce phone or pager units with different languages.

Preferably, the cover is made from a material that is available in a variety of colors, permitting the user to choose a desired color for an existing device. In this way, a system of replaceable outer covers of varying visual presentation can be made for a single phone or pager unit.

FIGS. 2–7 illustrate a preferred embodiment of a cover according to the present invention. The particular cover illustrated is designed to fit over the Ericsson, Inc. model phone shown in FIG. 1. As mentioned earlier, covers according to the invention can be custom designed to fit any type, size, or shape of phone, pager unit, or other personal communication device available on the market.

The cover, generally denoted by reference numeral 40, is preferably manufactured of thin plastic material, and preferably of 0.03 inch thick injection molded, durable plastic. Other materials and thicknesses may be used as long as sufficient rigidity is provided. Materials such as rigid plastic are also easy to clean and provide a firm surface upon which to hold the enclosed phone.

Figure 3:
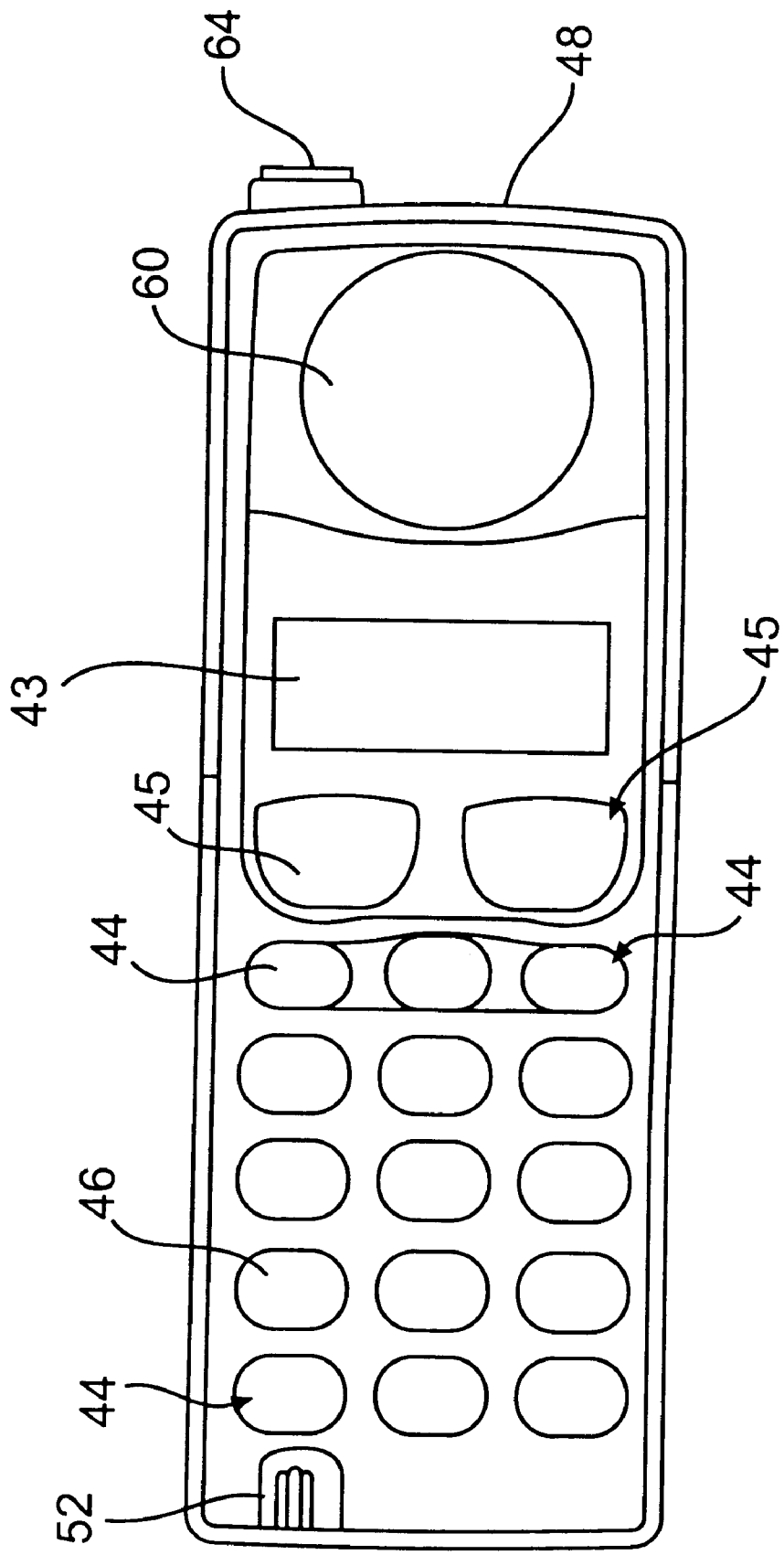
FIG. 3 is a top view of the cover shown in FIG. 2.
Figure 4:
FIG. 4 is a side view of the cover shown in FIG. 2.

The inner dimensions of cover 40 correspond to the outer dimensions of phone 10 and the external components thereof. Cover 40 includes a plurality of openings, as most clearly shown in FIG. 2. The sizes of these openings also corresponds to the sizes of the buttons, keys, and other external features of phone 10. An opening 42 allows access to phone display 18 and function keys 16 for the send and end buttons of the phone unit. As shown in FIG. 3, in the alternative to one large opening 42, cover 40 may include an opening 43 for display 18, and openings 45 for access to function keys 16. Cover 40 further includes openings 44 that permit access to the recall, clear, and menu function keys 14 of phone 10, and openings 46 allowing access to numerical keys 12 and the * and # keys 12 of phone 10. An opening 48 permits the user to see a power indicator of phone 10 (not shown in FIG. 1). An opening 50 allows air to circulate to openings 26 of phone 10 and ultimately to the power amp of the phone unit. An opening 52 corresponds to microphone 20 of phone 10, and openings 54 and 56 correspond to openings 24 of phone 10 for a vehicle mounted car kit. A recess 60 is a recessed area that corresponds to ear piece 22 of phone 10. Recess 60 includes slots 62 or other appropriate openings for permitting sound therethrough. An opening 64, shown in FIGS. 3–5 and 7, allows the antenna and car kit mount of the phone unit to mount to an external mobile antenna. An opening 68 permits connection with external equipment, such as, for example, a car kit.

Figure 5:
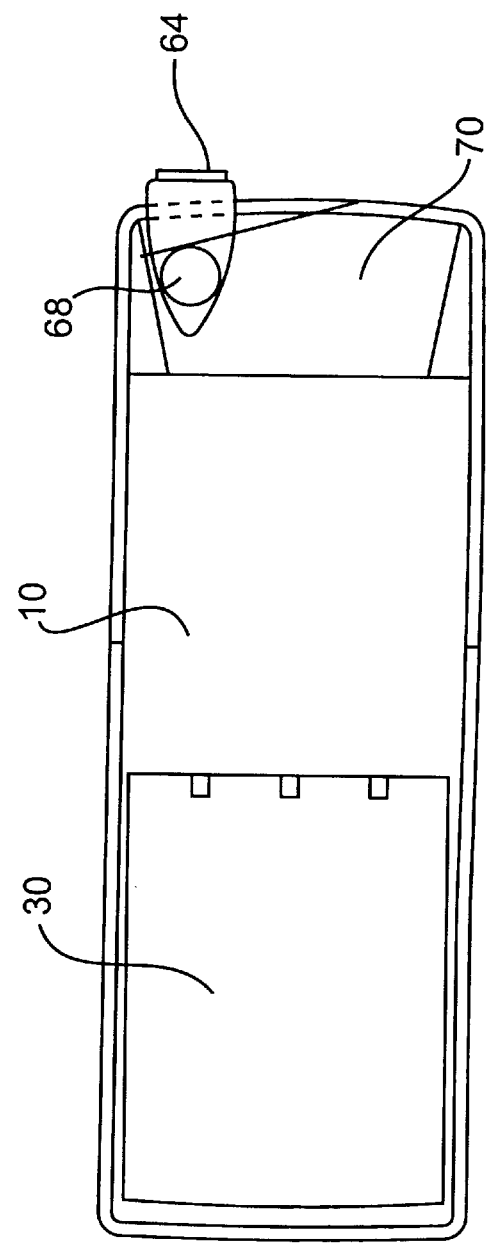
FIG. 5 is a bottom view of the cover shown in FIG. 2 fitted over a telephone.
Figure 6:
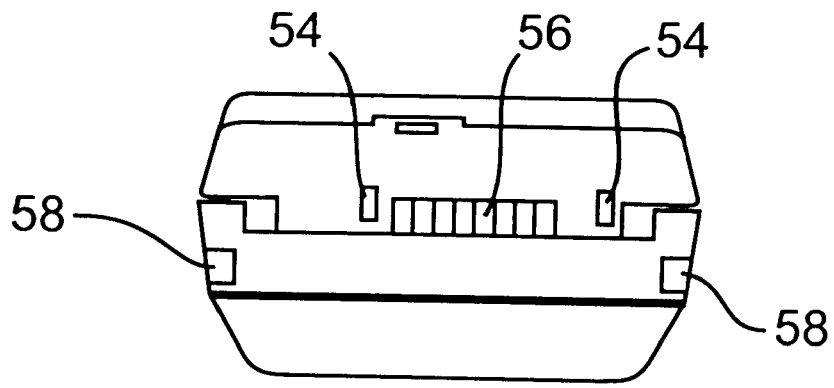
FIG. 6 is a view of the lower side portion of the cover shown in FIG. 2.
Figure 7:
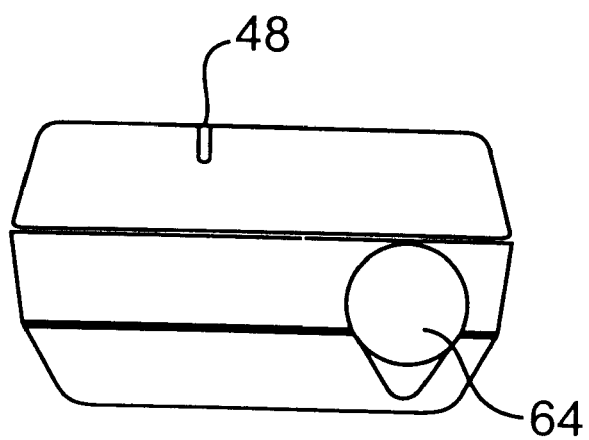
FIG. 7 is a view of the upper side portion of the cover shown in FIG. 2.

Preferably, the bottom of cover 40 is open to permit insertion of phone 10 into cover 40. As shown in FIG. 5, cover 40 includes a partial extension 70 that partially extends over the bottom of cover 40 from the upper side of cover 40. Phone 10 inserts into cover 40 at the bottom of cover 40 and underneath partial extension 70. To then secure phone 10 within cover 40, cover 40 is provided with slotted indentations 58 (FIGS. 2 and 4) that snap cover 40 onto phone 10. Indentations 58 cooperate with corresponding indentations in phone 10 to act as a clasp, holding cover 40 onto phone 10.

As shown in FIG. 5, cover 40 permits access to the back of phone 10 which includes an opening 30 for placement of a battery. A battery can thereby be replaced without removing cover 40.

It will be apparent to those skilled in the art that various modifications and variations can be made in the outer cover of the present invention and in construction of the outer cover without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A replaceable outer cover for a personal communication device, the device having a permanent rigid external housing enclosing internal working components of the device, the housing being substantially noninteractive with internal working components, the housing having a front side exposing controls of the device and a back side secured to the front side, said outer cover comprising a rigid cover having inside dimensions configured to conform to the outside dimensions of said external housing, said rigid cover formed to define an open back side of sufficient size to permit insertion of said external housing into said outer cover through said open back side, said outer cover having at one end thereof a partial extension proximate said open back side to receive and hold said external housing in position, and said outer cover having at an opposite end of said open back side at least one clasp to grasp and hold said external housing in place at said opposite end, said outer cover comprising a unitary structure permitting insertion and removal of said external housing into and out of said outer cover while said outer cover remains unitary.

2. An outer cover of claim 1 adapted for use with a portable telephone having a replaceable battery on the back side thereof, said open back side of said outer cover being sufficiently large to permit removal of said battery through said open back side.

3. An outer cover of claim 1 wherein said clasp comprises at least one indentation on an inner surface of said opposite end of said outer cover, said indentation adapted to cooperate with an indentation in said rigid external housing of said communication device to thereby act as a clasp.

4. A system of replaceable outer covers for a personal communication device, the device having a permanent rigid external housing enclosing internal working components of the device, the housing being substantially noninteractive with internal components, the housing having a front side exposing controls of the device and a back side secured to the front side, said outer covers each including inside dimensions configured to conform to the outside dimensions of said external housing, said outer covers each being a rigid structure formed to define an open back side of sufficient size to permit insertion of said external housing into said outer cover through said open back side, said outer covers each having at one end thereof a partial extension proximate said back side to receive and hold said external housing in position, and said outer covers each having at an opposite end thereof at least one clasp to removably grasp and hold said external housing in place at said opposite end, each of said plurality of outer covers having a different visual presentation allowing selective alteration of the visual presentation of said personal communication device.

5. A system of claim 4 adapted for use with a portable telephone having a replaceable battery on the back side thereof, said open back side of each said outer cover being sufficiently large to permit removal of said battery through said open back side.

6. A system of claim 4 wherein said clasp comprises at least one indentation on an inner surface of said opposite end of said outer covers, said indentation adapted to cooperate with an indentation in said rigid external housing of said communication device to thereby act as a clasp.

7. A replaceable outer cover for a personal communication device, the device having a permanent rigid external housing enclosing internal working components of the device, the housing being substantially noninteractive with internal working components, the housing having a front side exposing external features of the device and a back side secured to the front side, the outer cover having inside dimensions conforming to outer dimensions of the external housing, and a plurality of openings to correspond to external features of the personal communication device, said cover having sufficient rigidity so as to provide access to the external features through said plurality of openings.

8. The replaceable outer cover of claim 7, wherein said cover is a unitary structure comprised of a molded plastic material having a relatively high rigidity and obtainable in a variety of colors.

* * * * *